(12) United States Patent
Schluetter

(10) Patent No.: US 8,676,693 B2
(45) Date of Patent: Mar. 18, 2014

(54) SYSTEM AND METHOD FOR RISK MANAGEMENT USING AVERAGE EXPIRATION TIMES

(75) Inventor: Jens-Uwe Schluetter, Evanston, IL (US)

(73) Assignee: Trading Technologies International, Inc, Chicago, IL (US)

( * ) Notice: Subject to any disclaimer, the term of this patent is extended or adjusted under 35 U.S.C. 154(b) by 430 days.

(21) Appl. No.: 12/758,791

(22) Filed: Apr. 12, 2010

(65) Prior Publication Data

US 2010/0211523 A1 Aug. 19, 2010

Related U.S. Application Data

(63) Continuation of application No. 10/452,032, filed on May 30, 2003, now Pat. No. 7,792,735, which is a continuation-in-part of application No. 10/339,947, filed on Jan. 10, 2003, now Pat. No. 7,603,303.

(60) Provisional application No. 60/429,185, filed on Nov. 26, 2002.

(51) Int. Cl.
*G06Q 40/00* (2012.01)
(52) U.S. Cl.
USPC .......................................................... 705/37
(58) Field of Classification Search
USPC .......................................................... 705/37
See application file for complete search history.

(56) References Cited

U.S. PATENT DOCUMENTS

| | | | |
|---|---|---|---|
| 5,557,517 A * | 9/1996 | Daughterty, III | ............... 705/37 |
| 5,963,923 A | 10/1999 | Garber | |
| 6,064,985 A | 5/2000 | Anderson | |
| 6,321,212 B1 | 11/2001 | Lange | |
| 6,421,653 B1 | 7/2002 | May | |
| 6,938,009 B1 | 8/2005 | Herbst | |
| 7,024,384 B2 | 4/2006 | Daughtery, III et al. | |
| 7,039,610 B2 | 5/2006 | Morano | |
| 7,146,336 B2 * | 12/2006 | Olsen et al. | ...................... 705/37 |

(Continued)

FOREIGN PATENT DOCUMENTS

| | | |
|---|---|---|
| WO | WO 00/48113 | 8/2000 |
| WO | WO 00/65510 | 11/2000 |

OTHER PUBLICATIONS

Futures and Index Options Risk Management System: "HKCC: Client Margining System at the Hong Kong Futures Exchange," http://www.hkex.com.hk/rulereg/futrsksys/futrsksys2.htm; Dec. 2, 2002.

(Continued)

*Primary Examiner* — Jessica Lemieux
(74) *Attorney, Agent, or Firm* — McDonnell Boehnen Hulbert & Berghoff LLP

(57) ABSTRACT

A margin requirement is computed while trading. The margin requirement may be calculated while trading because the preferred system takes into account working orders to generate the margin requirement. The on the fly possibility allows the preferred system to provide pre-trade risk calculations, but can also be used to provide post-trade calculations. A generic spread number and the maximum number of outright positions are determined. Average expirations for the generic spread are computed. Using the spread positions, the average expirations and the maximum number of outright positions, a spread margin and an outright margin are calculated, which when summed provide a total margin requirement. Limits based in part on the total margin requirement may be imposed on one or more traders.

20 Claims, 13 Drawing Sheets

| | INPUTS | | | | | | CALCULATIONS | | |
|---|---|---|---|---|---|---|---|---|---|
| | Filled Positions | | Outright Positions | | Positions Based on Spreads | | | | |
| Month | Net Long | Net Short | W Buy | W Sell | W Buy | W Sell | Time to Exp | Weight Buy | Weight Sell |
| March | 1 | 0 | 0 | 0 | 0 | 0 | 1 | 1 | 0 |
| June | 0 | 1 | 0 | 0 | 0 | 0 | 4 | 0 | 4 |
| September | 0 | 0 | 0 | 0 | 0 | 0 | 7 | 0 | 0 |
| December | 0 | 0 | 0 | 0 | 0 | 0 | 10 | 0 | 0 |
| TOTAL | 1 | 1 | 0 | 0 | — | — | — | 1 | 4 |

| | | | Avg. Distance | 1 | 4 |
|---|---|---|---|---|---|
| CALCULATIONS CONTINUED | | | Avg. Spread Length | 3 | |
| Spreads | 1 | S - Margin (Time Base = 20) | 60 | Spread Indicator | LONG |
| Outrights | 0 | O- Margin (Base = 2000) | 0 | | |
| Max Outrights | 0 | TOTAL MARGIN | 60 | | |

(56) References Cited

U.S. PATENT DOCUMENTS

| | | |
|---|---|---|
| 7,149,713 B2 | 12/2006 | Bove et al. |
| 7,243,083 B2 * | 7/2007 | Burns et al. ............ 705/37 |
| 7,418,420 B2 | 8/2008 | Billings et al. |
| 7,430,532 B2 | 9/2008 | Wizon et al. |
| 7,437,325 B2 | 10/2008 | Kemp, II et al. |
| 7,584,130 B1 | 9/2009 | Schluetter |
| 7,603,303 B1 | 10/2009 | Kraus |
| 7,693,774 B2 | 4/2010 | Howorka et al. |
| 7,792,735 B1 | 9/2010 | Schluetter |
| 7,890,412 B2 | 2/2011 | Morano et al. |
| 7,991,667 B2 | 8/2011 | Kraus et al. |
| 8,255,313 B2 | 8/2012 | Kraus et al. |
| 8,380,599 B2 | 2/2013 | Kraus et al. |
| 2001/0049651 A1 | 12/2001 | Selleck |
| 2001/0056392 A1 | 12/2001 | Daughtery |
| 2002/0004774 A1 | 1/2002 | Defarlo |
| 2002/0103742 A1 | 8/2002 | Billings |
| 2002/0116317 A1 | 8/2002 | May |
| 2002/0133455 A1 | 9/2002 | Howorka |
| 2002/0188544 A1 | 12/2002 | Wizon |
| 2002/0194115 A1 * | 12/2002 | Nordlicht et al. ........ 705/37 |
| 2003/0009419 A1 | 1/2003 | Chavez |
| 2003/0163404 A1 | 8/2003 | Hu |
| 2003/0200167 A1 | 10/2003 | Kemp |
| 2004/0024692 A1 | 2/2004 | Turbeville |
| 2005/0038731 A1 * | 2/2005 | Sweeting et al. ........ 705/37 |
| 2010/0005036 A1 | 1/2010 | Kraus |
| 2011/0246353 A1 | 10/2011 | Kraus et al. |
| 2012/0226598 A1 | 9/2012 | Kraus et al. |

OTHER PUBLICATIONS

Sydney Futures Exchange Clearing House PTY Limited: "Standard Portfolio of Risk".

Trading Technologies: "X_Risk: Risk Monitoring and Trader Administration for X_Trader.".

Trading Technologies: "X_Trader, X_Risk", http://www.ttradingtechnologies.com/xrisk.aspx; Jun. 14, 2007.

Trading Technologies: "X_Risk Plus: Streamline Your Risk Management; Comprehensive Fast Reporting; Visual and Audible Alert System.".

Trading Technologies: "X_Risk Plus: Minimize Trading Errors.".

Trading Technologies TT Provisional Services: "Risk Inserter.".

Trading Technologies: "X_Risk: Risk Management for the X_Trader Order Entry System.".

Trading Technologies: "X_Risk: X_RISK enables risk managers, desk managers and permissioned traders to monitor the trading activity for all traders/customers, across all exchanges, from any location.".

Chicago Board of Options Exchange Margin Manual: Apr. 2000.

Risk Controls, FI Magazine, Apr./May 2001.

CBOT, Review of Standard Portfolio Analysis of Risk ("SPAN"), Apr. 2001.

U.S. Appl. No. 10/452,032, filed May 30, 2003.

U.S. Appl. No. 11/415,996, filed, May 2, 2006.

U.S. Appl. No. 11/415,889, filed May 2, 2006.

U.S. Appl. No. 10/339,947, filed Jan. 10, 2003.

U.S. Appl. No. 12/559,480, filed Sep. 14, 2009.

Collins, D.P., "CME Extends Margin Allowances for FCMs," Futures, Oct. 2002, vol. 31, No. 13, ProQuest Central, p. 14.

Hardouvelis, G.A. and Kim, D., "Margin Requirements, Price Fluctuations, and Market Participation in Metal Futures," Journal of Money, Credit and Banking, Aug. 1995, vol. 7, No. 3, ProQuest Central, p. 659.

* cited by examiner

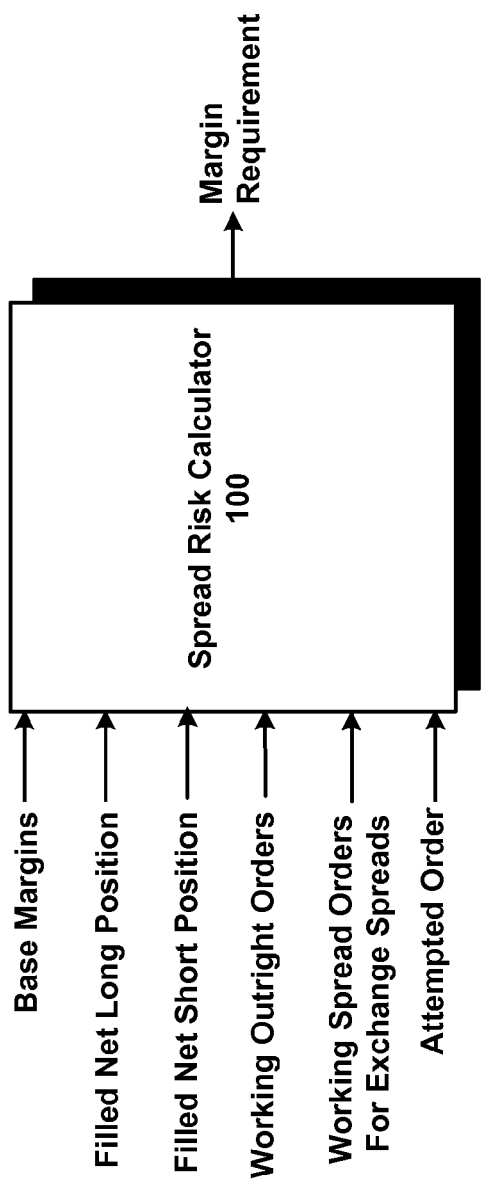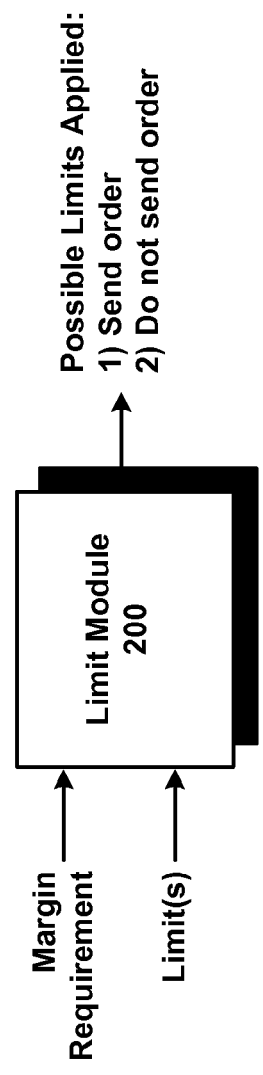

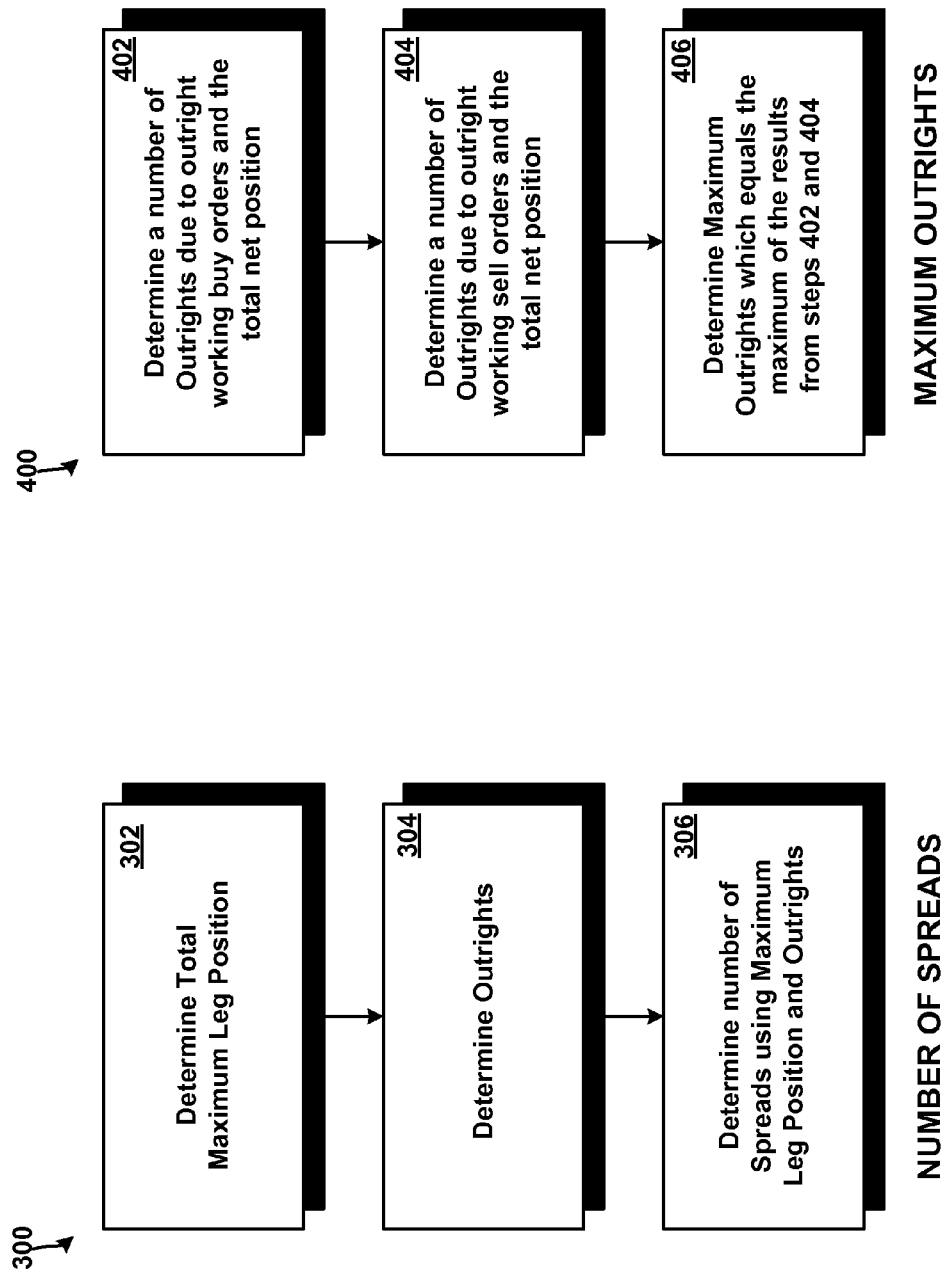

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 0 | 0 | 1 | 0 | 0 | 0 | 0 |
| June | 0 | 0 | 0 | 0 | 0 | 0 | 0 |
| September | 0 | 0 | 0 | 0 | 0 | 0 | 0 |
| December | 0 | 0 | 0 | 0 | 0 | 0 | 0 |
| TOTAL | 0 | 0 | 1 | 0 | — | — | 0 |

| CALCULATIONS CONTINUED | | S - Margin (Base = 10) | O- Margin (Base = 100) | TOTAL MARGIN |
|---|---|---|---|---|
| Spreads | 0 | 0 | | |
| Outrights | 0 | | 100 | |
| Max Outrights | 1 | | | 100 |

FIG. 5

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 0 | 0 | 1 | 0 | 0 | 0 | 0 |
| June | 0 | 0 | 0 | 1 | 0 | 0 | 0 |
| September | 0 | 0 | 0 | 0 | 0 | 0 | 0 |
| December | 0 | 0 | 0 | 0 | 0 | 0 | 0 |
| TOTAL | 0 | 0 | 1 | 1 | — | — | 0 |

| CALCULATIONS CONTINUED | | |
|---|---|---|
| Spreads | 0 | S - Margin (Base = 10) | 0 |
| Outrights | 0 | O- Margin (Base = 100) | 100 |
| Max Outrights | 1 | TOTAL MARGIN | 100 |

FIG. 6

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 1 | 0 | 0 | 0 | 0 | 0 | 1 |
| June | 0 | 0 | 0 | 1 | 0 | 0 | 0 |
| September | 0 | 0 | 0 | 0 | 0 | 0 | 0 |
| December | 0 | 0 | 0 | 0 | 0 | 0 | 0 |
| TOTAL | 1 | 0 | 0 | 0 | — | — | 1 |

| CALCULATIONS CONTINUED | | |
|---|---|---|
| Spreads | 0 | S - Margin (Base = 10) | 0 |
| Outrights | 1 | O - Margin (Base = 100) | 100 |
| Max Outrights | 1 | TOTAL MARGIN | 100 |

FIG. 7

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 1 | 0 | 0 | 0 | 0 | 0 | 1 |
| June | 0 | 1 | 0 | 0 | 0 | 0 | 1 |
| September | 0 | 0 | 0 | 0 | 0 | 0 | 0 |
| December | 0 | 0 | 0 | 0 | 0 | 0 | 0 |
| TOTAL | 1 | 1 | 0 | 0 | — | — | 2 |

| CALCULATIONS CONTINUED | | |
|---|---|---|
| Spreads | S - Margin (Base = 10) | 10 |
| Outrights | O- Margin (Base = 100) | 0 |
| Max Outrights | TOTAL MARGIN | 10 |

FIG. 8

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 1 | 0 | 0 | 0 | 1 | 0 | 2 |
| June | 0 | 1 | 0 | 0 | 0 | 1 | 2 |
| September | 0 | 0 | 0 | 0 | 0 | 0 | 0 |
| December | 0 | 0 | 0 | 0 | 0 | 0 | 0 |
| TOTAL | 1 | 1 | 0 | 0 | — | — | 4 |

| CALCULATIONS CONTINUED | | S - Margin (Base = 10) | O- Margin (Base = 100) | TOTAL MARGIN |
|---|---|---|---|---|
| Spreads | 2 | 20 | | |
| Outrights | 0 | | 0 | |
| Max Outrights | 0 | | | 20 |

| | INPUTS | | | | | | CALCULATIONS |
|---|---|---|---|---|---|---|---|
| | Filled Positions | | Outright Positions | | Positions Based on Spreads | | |
| Month | Net Long | Net Short | W Buy | W Sell | W Buy | W Sell | Max Leg Position |
| March | 2 | 0 | 0 | 0 | 0 | 0 | 2 |
| June | 0 | 2 | 0 | 0 | 0 | 0 | 2 |
| September | 0 | 0 | 0 | 0 | 0 | 0 | 0 |
| December | 0 | 0 | 0 | 0 | 0 | 0 | 0 |
| TOTAL | 2 | 2 | 0 | 0 | — | — | 4 |

| CALCULATIONS CONTINUED | | S - Margin (Base = 10) | O - Margin (Base = 100) |
|---|---|---|---|
| Spreads | 2 | 20 | |
| Outrights | 0 | | 0 |
| Max Outrights | 0 | TOTAL MARGIN | 20 |

| | INPUTS | | | | | | | CALCULATIONS | | |
|---|---|---|---|---|---|---|---|---|---|---|
| | Filled Positions | | Outright Positions | | Positions Based on Spreads | | | | | |
| Month | Net Long | Net Short | W Buy | W Sell | W Buy | W Sell | Time to Exp | Weight Buy | Weight Sell |
| March | 1 | 0 | 0 | 0 | 0 | 0 | 1 | 1 | 0 |
| June | 0 | 1 | 0 | 0 | 0 | 0 | 4 | 0 | 4 |
| September | 0 | 0 | 0 | 0 | 0 | 0 | 7 | 0 | 0 |
| December | 0 | 0 | 0 | 0 | 0 | 0 | 10 | 0 | 0 |
| TOTAL | 1 | 1 | 0 | 0 | — | — | — | 1 | 4 |

| | Avg. Distance | |
|---|---|---|
| | Avg. Spread Length | 1 |
| | Spread Indicator | 3 |
| | | LONG |

| CALCULATIONS CONTINUED | | |
|---|---|---|
| Spreads | S - Margin (Time Base = 20) | 60 |
| Outrights | O- Margin (Base = 2000) | 0 |
| Max Outrights | TOTAL MARGIN | 60 |

| Spreads | 1 |
| Outrights | 0 |
| Max Outrights | 0 |

FIG. 11

| | INPUTS | | | | | | CALCULATIONS | | |
|---|---|---|---|---|---|---|---|---|---|
| | Filled Positions | | Outright Positions | | Positions Based on Spreads | | | | |
| Month | Net Long | Net Short | W Buy | W Sell | W Buy | W Sell | Time to Exp | Weight Buy | Weight Sell |
| March | 1 | 0 | 0 | 0 | 0 | 0 | 1 | 1 | 0 |
| June | 0 | 0 | 0 | 0 | 0 | 0 | 4 | 0 | 0 |
| September | 0 | 1 | 0 | 0 | 0 | 0 | 7 | 0 | 7 |
| December | 0 | 0 | 0 | 0 | 0 | 0 | 10 | 0 | 0 |
| TOTAL | 1 | 1 | 0 | 0 | — | — | — | 1 | 7 |
| | | | | | | Avg. Distance | | 6 | |
| | | | | | | Avg. Spread Length | | | |
| | | | | | | Spread Indicator | | LONG | |

| CALCULATIONS CONTINUED | | |
|---|---|---|
| Spreads | S - Margin (Time Base = 20) | 120 |
| Outrights | O- Margin (Base = 2000) | 0 |
| Max Outrights | TOTAL MARGIN | 120 |

FIG. 12

| | INPUTS | | | | | | | CALCULATIONS | | |
|---|---|---|---|---|---|---|---|---|---|---|
| | Filled Positions | | Outright Positions | | Positions Based on Spreads | | | | | |
| Month | Net Long | Net Short | W Buy | W Sell | W Buy | W Sell | Time to Exp | Weight Buy | Weight Sell |
| March | 1 | 0 | 0 | 0 | 0 | 0 | 1 | 1 | 0 |
| June | 0 | 1 | 0 | 0 | 0 | 0 | 4 | 0 | 4 |
| September | 0 | 0 | 0 | 0 | 2 | 0 | 7 | 14 | 0 |
| December | 0 | 0 | 0 | 0 | 0 | 2 | 10 | 0 | 20 |
| TOTAL | 1 | 1 | 0 | 0 | — | — | — | 15 | 24 |
| | | | | | | | Avg. Distance | 5 | 8 |
| | | | | | | | Avg. Spread Length | 3 | |
| | | | | | | | Spread Indicator | LONG | |

| CALCULATIONS CONTINUED | S - Margin (Time Base = 20) | O - Margin (Base = 2000) | TOTAL MARGIN |
|---|---|---|---|
| Spreads | 3 | | |
| Outrights | 0 | | |
| Max Outrights | 0 | | |
| | 180 | 0 | 180 |

FIG. 13

| | INPUTS | | | | | | | CALCULATIONS | | |
|---|---|---|---|---|---|---|---|---|---|---|
| | Filled Positions | | Outright Positions | | Positions Based on Spreads | | | | | |
| Month | Net Long | Net Short | W Buy | W Sell | W Buy | W Sell | Time to Exp | Weight Buy | Weight Sell |
| March | 10 | 0 | 0 | 0 | 0 | 0 | 1 | 10 | 0 |
| June | 0 | 7 | 0 | 0 | 0 | 0 | 4 | 0 | 28 |
| September | 2 | 0 | 0 | 0 | 0 | 0 | 7 | 14 | 0 |
| December | 0 | 5 | 0 | 0 | 0 | 0 | 10 | 0 | 50 |
| TOTAL | 12 | 12 | 0 | 0 | — | — | — | 24 | 78 |
| | | | | | | | Avg. Distance | 2 | 6.5 |
| | | | | | | | Avg. Spread Length | 4.5 | |
| | | | | | | | Spread Indicator | SHORT | |

| CALCULATIONS CONTINUED | | |
|---|---|---|
| Spreads | 12 | |
| Outrights | 0 | |
| Max Outrights | 0 | |
| S - Margin (Time Base = 20) | | 1080 |
| O- Margin (Base = 2000) | | 0 |
| TOTAL MARGIN | | 1080 |

FIG. 14

| | INPUTS | | | | | | | CALCULATIONS | | |
|---|---|---|---|---|---|---|---|---|---|---|
| | Filled Positions | | Outright Positions | | Positions Based on Spreads | | | | | |
| Month | Net Long | Net Short | W Buy | W Sell | W Buy | W Sell | Time to Exp | Weight Buy | Weight Sell |
| March | 2 | 0 | 0 | 0 | 0 | 0 | 1 | 2 | 0 |
| June | 0 | 0 | 1 | 0 | 0 | 0 | 4 | 0 | 0 |
| September | 0 | 2 | 0 | 0 | 0 | 0 | 7 | 0 | 14 |
| December | 0 | 0 | 0 | 0 | 0 | 0 | 10 | 0 | 0 |
| TOTAL | 2 | 2 | 1 | 0 | — | — | — | 2 | 14 |
| | | | | | | | Avg. Distance | 1 | 7 |
| | | | | | | | Avg. Spread Length | 6 | |
| | | | | | | | Spread Indicator | LONG | |

| CALCULATIONS CONTINUED | |
|---|---|
| Spreads | 2 |
| S - Margin (Time Base = 20) | 240 |
| Outrights | 0 |
| O- Margin (Base = 2000) | 2000 |
| Max Outrights | 1 |
| TOTAL MARGIN | 2240 |

FIG. 15

SYSTEM AND METHOD FOR RISK MANAGEMENT USING AVERAGE EXPIRATION TIMES

RELATED APPLICATIONS

The present application is a continuation of application Ser. No. 10/452,032, filed on May 30, 2003, and issued on Sep. 7, 2010 as U.S. Pat. No. 7,792,735. The Ser. No. 10/452,032 application claims priority to U.S. Provisional Patent Application No. 60/429,185, filed Nov. 26, 2002. The Ser. No. 10/452,032 application also is a continuation-in-part of U.S. patent application Ser. No. 10/339,947, filed on Jan. 10, 2003, and issued on Oct. 13, 2009 as U.S. Pat. No. 7,603,303, which in turn claims priority to U.S. Provisional Patent Application No. 60/429,185, filed on Nov. 26, 2002. The contents of each of the above-disclosed applications are incorporated herein by reference in their entirety.

FIELD OF THE INVENTION

The present invention is related to electronic exchanges and in particular, the present invention is directed towards a system and method for risk management.

BACKGROUND OF THE INVENTION

An electronic exchange provides a matching process between buyers and sellers. Some well known electronic exchanges include Eurex, London International Financial Futures and Options Exchange ("LIFFE"), Euronext, Chicago Mercantile Exchange ("CME"), Chicago Board of Trade ("CBOT"), Xetra, and Island. Buyers and sellers, collectively referred to as traders, are typically connected to one or more electronic exchanges by way of a communication link. The traders submit buy or sell orders to the electronic exchange over the communication link. They also obtain price information and order fill information from the exchange.

Electronic exchanges are becoming successful venues for trading. Indeed, an increasing number of people are actively participating in a market at any one given time. The increase in the number of potential market participants has advantageously led to, among other things, a more competitive market and greater liquidity than with traditional methods of trading, such as open outcry.

Traders sometimes prefer to trade only one tradeable object at a time, and sometimes traders wish to trade more than one tradeable object at a time in a strategy referred to as spreading or strategy trading. As used herein, the term "tradeable object" refers to anything that can be traded with a quantity and price. For example, tradeable objects may include, but are not limited to, all types of traded financial products, such as, for example, stocks, options, bonds, futures, currency, and warrants, as well as funds, derivatives and collections of the foregoing. Moreover, tradeable objects may include all types of commodities, such as grains, energy, and metals. A tradeable object may be "real", such as products that are listed by an exchange for trading, or "synthetic", such as a combination of real products that is created by the trader. A tradeable object could actually be a combination of other tradeable objects, such as a class of tradeable objects.

As mentioned above, some traders trade one tradeable object. For example, a trader might trade the June 2002 corn contract. That is, the trader is offering to buy or willing to sell the corn contract, depending on his or her trading strategy. Likewise, a trader might trade a December 2003 corn contract, a corn contract from another month or another type of contact altogether. As is common, however, traders may trade more than one tradeable object at a time. For example, a trader may buy multiple different tradeable objects, sell multiple different tradeable objects, or buy and sell a combination of different tradeable objects. While the different buys and sells may comprise unrelated positions for the trader, they may alternatively be part of a specific trading strategy—such as a spread.

Spreading is a trading strategy that traders might use to hedge risk. That is, a spread can be used to reduce the trader's downside risk of trading a tradeable object. A spread generally includes buying at least one tradeable object and, usually at the same time, selling at least one different tradeable object. For example, a trader could spread trade the June 2002 corn contract and the December 2003 corn contract, such as buying the June 2002 corn contract and selling the December 2003 corn contract, or vice versa.

In this example, the June/December corn contract spread has two legs. The June 2002 corn contact makes one leg, while the December 2003 corn contract makes the second leg. The legs refer to the portions of the trade associated with each individual tradeable object, which can also be referred to as an outright market. A spread, however, can have more than two legs. Additionally, spreads can be created based on relationships other than calendar months. One such example would be trading a 10 year note and a 5 year note, however, other examples also exist.

As previously described, spreads may reduce a trader's downside risk when compared to trading a single outright position. The tradeable objects comprising the legs of a spread ordinarily share a price correlation. Thus, their prices generally move in the same direction. For example, a decrease in the price of one leg would then generally correspond to a decrease in the price of another leg. Placing opposing trades, such as buying one leg and selling the other leg, reduces the potential downside risk, because a decrease in the price of one leg (e.g., the buy leg) that causes the trader to lose money would be offset by the corresponding decrease in the price of the other leg (e.g., the sell leg) that causes the trader to gain money.

Spread trading can also be used to roll an outright position forward. Fund managers and other market participants that hold longer term positions can use futures or other instruments to hedge risk. Since futures and other derivatives have an expiration date, these positions can be rolled from one expiration date to the next. Generally, this can be achieved by trading a spread.

Common to trading most tradeable objects, when a trader places an order for a tradeable object, the trader needs only to put up a fraction of the value of the tradeable object. This is oftentimes referred to as margin trading, and it allows the trader to trade a much larger amount of the tradeable object than if the trader simply bought or sold the tradeable object outright (e.g., by paying cash). In order to trade on margin, a trader generally deposits a certain amount of cash in a margin account with a trading house, which the trader uses to access the exchange. In return, the trading house grants the trader a margin balance, which is typically greater than the amount of cash the trader deposited in the margin account. The trader can then buy and sell tradeable object against the margin balance.

Each tradeable object position held by a trader, whether a long position or a short position, has associated with it a margin requirement, sometimes also called a margin amount. The margin requirement generally refers to an amount of margin required to hold that position. When the trader's initial order for a position is filled, the margin requirement for that position is deducted from the trader's margin account. The margin requirement for that position, however, does not necessarily remain fixed. Changes in the market price for the position may cause a corresponding change in the position's margin requirement, thereby also affecting the balance in the trader's margin account. Of course, factors other than the market price for the position may alter the margin requirement.

Usually, a clearing house computes the margin requirements after every trading session, sometimes referred to as post-trade risk calculation. There are many different types of margin requirements usually depending on the type of tradeable object and clearing house. However, in general, a spread position is usually considered to be a lower risk strategy than an outright long or an outright short position, and therefore margin requirements for spreads are often much less than for outright positions. For example, if the price trend of a tradeable object is currently up and the trader is in a spread, (e.g., short one month and long another) the gain on the long position would likely offset the loss of the short position, and vice-versa. One side of the spread typically hedges the other, therefore the lower margin requirements.

One well known tool for computing margin requirements in circumstances such as these is Standard Portfolio Analysis of Risk ("SPAN"), which is a margining system developed by the Chicago Mercantile Exchange ("CME"). SPAN uses a set of pre-determined parameters set by the clearing house to assess what the maximum potential loss will be for a given portfolio over a one-day period. SPAN and systems like SPAN are typically used at the end of the trading day to recompute margin requirements for a trader's outstanding positions and thereby to also recompute the available margin in the trader's margin account.

The parameters used by SPAN in computing the margin requirements can take into account various different factors. For example, SPAN can recognize that two opposing outright positions of similar tradeable objects (e.g., a buy of one tradeable object and a sell of another similar tradeable object) may in fact comprise a spread. Thus, instead of trading the spread as a single tradeable object (e.g., trading in a spread market), the trader may have separately purchased the legs of the spread (e.g., trading individual legs in an outright market). As previously explained, the spread has less of a risk associated with it than with uncorrelated outright positions. Therefore, the two outright positions comprising the spread should have a lower margin requirement than if they were considered as separate outright positions.

The margin requirement calculations performed by SPAN, while accounting for many different market factors, are computationally intensive. Therefore, they are not well suited for real-time use while the exchange is open for trading. If they were used during the trading day, for example as a pre-trade calculation to determine if a trader has enough available margin to place a trade, they would cause an unreasonable delay in executing the trade. This may cause the trader to miss placing the trade, for example, if the market had already moved away from the trader's order price, or they may cause the trader to have a less advantageous position in the queue for open orders at the particular price level for that trade. Additionally, as SPAN was designed for use at the end of the trading day, it does not take into account the margin requirements of working orders.

In spite of the limitations of SPAN, trading houses and individual traders still attempt to keep track of their margin requirements throughout the day; however, this is currently done with much more simplistic methods. Current pre-trade calculations are usually done by determining the number of markets in which a trader has a position and then multiplying those positions by the margin requirement for outright legs. These quick calculations are not sophisticated enough to determine which of the outright positions may in fact comprise legs of a spread. Therefore, such calculations assume that the trader is only trading in outright long or short positions and not spread positions. As a result, the margin requirements are typically higher than they should be, which is not an accurate representation of the true margin requirements of the positions taking into account spreads and other trading strategies.

Therefore, there exists a need for an improved risk management system that can be used for real time pre-trade risk calculations.

DETAILED DESCRIPTION OF THE DRAWINGS

The presently preferred embodiments of the present invention are described herein with reference to the drawings, in which:

FIG. 1 shows an exemplary system in accordance with the preferred embodiments for receiving inputs and for determining a margin requirement based on the received inputs;

FIG. 2 shows an exemplary system in accordance with the preferred embodiment for receiving a computed margin and one or more limits and for determining whether to apply any limits to an order;

FIG. 3 shows a method in accordance with the preferred embodiment for determining the number of spread positions;

FIG. 4 shows a method in accordance with the preferred embodiment for determining the maximum number of outright positions;

FIGS. 5-10 show example inputs into the preferred system of FIG. 1, results of the calculations performed by the system, and the system's output including the computed total margin requirement; and FIGS. 11-15 show example inputs into the preferred system of FIG. 1, results of the calculations performed by the system and the system's output including the computed total margin requirement, in which the system uses average expirations in order to compute margin values for spreads.

DETAILED DESCRIPTION OF THE PRESENTLY PREFERRED EMBODIMENT

I. Overview

A system and method are described herein to calculate a margin requirement on the fly while trading, if so desired. The margin requirement may be calculated on the fly because it takes into account working orders to generate the margin requirement. The on the fly possibility allows the preferred system to provide pre-trade risk calculations. Pre-trade calculations generally refer to calculating the margin throughout the trading day, rather than just at the end of the day. Alternatively, the system can be implemented at the end of the day or at any other time to provide post-trade risk calculations.

Using the system of the preferred embodiment, certain limits based on the computed margin requirement can be imposed on one or more traders. These imposed limits are more realistic than previously possible with a conventional system because the preferred system accounts for orders that are working in various markets (e.g., outright markets and/or exchange spread markets) in addition to the trader's filled net position to generate a number of spreads and a number of outrights. Then, a more accurate margin requirement may be calculated based on the computed number of spreads and the computed number of outrights, which better models the potential risk. As a result, the trader or traders can be more confident that the computed margin requirement is more accurate and thus the limits imposed on them are more realistic than previously possible.

Many of the preferred system's users in various standing throughout the trading industry may benefit from the present invention. For example, an individual trader may use the preferred system at his or her trading terminal to track the margin requirement in real-time, thereby allowing the trader to readily use and/or view the margin available for future trades. The trader could also impose limits or restrictions on his or her trading as a result of the computed margin requirement. However, the system is not limited to individual traders, for instance, the preferred system can provide a margin requirement for a group of traders. Limits could then be imposed on the group of traders. Additionally, an administrator/risk manager at a trading house, at a clearing house, at an exchange or some other trading related entity may use the system to calculate margin requirements for one or more traders. They can use the preferred system, for example, to determine whether a trader has enough available margin for an order prior to submitting the order to an exchange. Then, for example, limits based in part on the computed margin requirement may be manually or automatically imposed on a trader or group of traders to restrict one or more of the traders from submitting orders. Other uses of the present invention will become readily apparent to one skilled in the art of trading from the description provided herein.

The present invention now will be described more fully hereinafter with reference to the accompanying drawings, in which preferred embodiments of the invention are shown. This invention may, however, be embodied in many different forms and should not be construed as limited to the embodiments set forth herein.

II. Software Overview

FIG. 1 shows a spread risk calculator 100 for receiving inputs and for determining a margin requirement based on the received inputs. The spread risk calculator 100 shown in the Figure exemplifies its modular architecture. That is, it is designed as a stand-alone unit that can work with other sections of a trading program, or the same module might be able to perform the same task in another program as well. Alternatively, the spread risk calculator 100 can be part of an integrated architecture, in which no particular divisions exist between components. Regardless of whether the spread risk calculator 100 is part of a modular or integrated architecture, the program may reside on any computing device such as a server, workstation, desktop computer, laptop computer, hand-held device, and so on to compute the margin requirement. Additionally, it can be programmed using one or more of a variety of different programming languages known in the art, such as C, C++, Java, Perl, or others. The system may also be programmed using a third-party software program, such as a well-known spreadsheet application provided by Microsoft® Excel.

The spread risk calculator 100 is presently programmed to receive at least some of the following inputs. They include base margins such as a base spread margin and a base outright margin (the base spread margin and the base outright margin are together referred to as "Base Margins"), filled net long position ("Filled Net Long Position"), filled net short position ("Filled Net Short Position"), working outright orders ("Working Outright Orders"), working spread orders ("Working Spread Orders For Exchange Spreads"), and an attempted order ("Attempted Order") which is described more below. These inputs may be in the form of parameters that are stored in memory and which are accessed by the spread risk calculator 100. Regardless of how the spread risk calculator 100 receives the inputs, as the input values change, it is preferable that the spread risk calculator 100 at least has access to the updated input values.

An attempted order is an order that a user or trading application is attempting to send to an exchange. Then, the system preferably uses the inventions described herein to determine whether to allow the attempted order to be sent to the exchange based on the margin risk analysis. In the preferred embodiment, the spread risk calculator 100 treats the attempted order as either a working outright order or a spread order. For instance, if a trader attempts to buy an exchange provided spread, the system will preferably treat this input as a working spread order for purposes of the margin requirement calculation. In another instance, if a trader attempts to buy a tradeable object in an outright market, the system will preferably treat this input as a working outright order for purposes of the margin requirement calculation. Then, in either instance, the system could determine whether to send the attempted order to the exchange based on the computed margin requirement and an available margin account balance.

The spread risk calculator 100 is presently programmed to calculate certain variables which are used to compute the margin requirement. Although these variables are described in greater detail below they include maximum leg positions, a total maximum leg position, a number of spreads (also referred to herein as a generic spread number), a number of outrights, and a maximum number of outrights. Using at least these variables, the preferred system then computes a spread margin and an outright margin. The spread margin is based on the number of spreads and the base spread margin value. The outright margin is based on the maximum number of outrights and the base outright margin value. Both the base spread margin value and the base outright margin value are set by the user, trading house, clearing house, and/or exchange. Then, the total margin requirement is the summation of the spread margin and the outright margin. The total margin requirement is output of the spread risk calculator 100.

FIG. 2 shows a limit module 200 for receiving a total margin requirement and one or more limits for determining whether to send an order, reject an order, or modify an order to fit within the limits. The limit module 200, like the spread risk calculator 100, is part of a modular architecture. Alternatively, the functionality of the limit module 200 may be programmed into an integrated architecture. The limit module 200 may reside on the same machine as the spread risk calculator 100, or it may reside on a separate machine. Any type of computing device such as those enumerated above with respect to the spread risk calculator 100 can be used to implement the limit module 200.

The limit module 200 is presently programmed to receive the margin requirement and one or more limits. Limits might include sending the order to the exchange if the margin balance is greater than the margin requirement and/or refraining from sending the order if the margin balance is less than the margin requirement. Then, the limit module 200 can be programmed to send a signal that indicates whether an attempted order should be sent or rejected. If the attempted order is rejected, it is not sent to the exchange. If desired, the rejected order may be deleted or queued for later use depending on how the system is programmed. Limits could be input by a trader or an administrator, for instance.

III. Preferred Methods for Computing a Margin Requirement

As described above, in the preferred embodiment, a spread margin and an outright margin are computed, which when summed together provides a margin requirement. Preferably, the margin requirement is computed every time there is an attempted order. Alternatively, the margin requirement can be computed at any time including when one of the input values changes.

The computed margin requirement can be used in many ways. For instance, as described with respect to FIG. 2, the computed margin requirement is used to limit or restrict the trading of one or more traders. That is, based on the computed margin requirement and one or more pre-set limits (e.g., user defined limits), for instance, an attempted order could be sent to the exchange or an attempted order could be prevented from being sent to the exchange. FIGS. 3 and 4 characterize preferred processes for computing a spread margin and an outright margin, respectively.

FIG. 3 shows a flowchart 300 illustrating a preferred method for computing a spread margin based on a calculated generic spread number. The generic spread number represents the possible number of spreads that could exist based upon the total maximum leg position and the total filled net position. To calculate the generic spread number each tradeable object traded by the trader is being considered as a leg of a spread. The maximum leg position represents the maximum position in each such leg. Examples with actual numbers are described below to illustrate the relationships described in flowchart 300. Additionally, it should be understood that the steps may be arranged in a different order or eliminated altogether unless otherwise noted. For example, according to flowchart 300, the order of steps 302 and 304 may be swapped.

At step 302, the total maximum leg position is determined. In the preferred embodiment, the total maximum leg position is the summation of the maximum leg positions for each tradeable object. The maximum leg position for each tradeable object is equal to the maximum of (absolute value (filled net long position−filled net short position+equivalent buy leg spread position), absolute value (filled net long position−filled net short position−equivalent sell leg spread position)). The equivalent buy leg spread position and the equivalent sell leg spread position are working orders that might be necessary to accomplish a spread order for an exchange provided spread. That is, the preferred system receives a spread order (or an attempted spread order) and preferably breaks down the spread order into equivalent buy/sell leg positions. For example, when a trader buys a March/June spread, the system would generate an equivalent buy position in March and an equivalent sell position in June. However, it is envisioned that some exchanges could break down spread orders into the leg positions and provide such information in its messages to the client devices. In such a case, it would not be necessary for the preferred system to perform the breakdown. Additionally, the equivalent buy/sell leg positions preferably include any attempted spread orders for an exchange provided spread. That is, when a trader attempts to buy or sell an exchange provided spread, the system preferably breaks down the attempted spread order into equivalent buy/sell leg positions.

According to the preferred embodiment, the computation of the maximum leg position does not take into account working orders in the outright markets. Instead, the outright working orders are taken into account in the calculation of the maximum number of outrights described with respect to FIG. 4.

At step 304, outrights is determined. Outrights (e.g., the absolute value of the total net position) represents the number of total outright positions, or equivalently, the number of positions (e.g., buy or sell) that are not considered part of a spread. The outrights is equal to the absolute value of (total filled net long position−the total filled net short position). The total filled net long position is the sum of all filled net long positions for each tradeable object. The total filled net short position is the sum of all filled net short positions for each tradeable object.

At step 306, the number of spreads is determined. In the preferred embodiment, the number of spreads is equal to the (total maximum leg position−outrights)/2. Note that the reason for dividing by two is that a calendar spread contains two legs, which is described more below.

According to the preferred embodiment, the number of spreads is sometimes referred to in this application as the generic spread number because the preferred system does not have to necessarily match leg-to-leg to form identified spreads. For instance, assume tradeable objects "A," "B," "C," and "D" were being traded, where "A" and "B" are legs to "Spread 1" and "C" and "D" are legs to "Spread 2." According to the preferred embodiment, it is not necessary that the legs "A" and "B" are matched to "Spread 1" and it is not necessary that the legs "C" and "D" are matched to "Spread 2." It should be understood, though, that the legs could be matched to particular spreads if programmed to do so.

Once the number of spreads (generic spread number) is determined, it may be used to compute the spread margin by multiplying the number of spreads by a base margin value for spreads. Recall that base margin values for spreads are generally less than base margin values for outright positions. As described above, the total margin required can then be computed by adding the spread margin to the outright margin. Calculation of the outright margin is outlined with respect to FIG. 4.

FIG. 4 shows a flowchart 400 illustrating a preferred method for computing an outright margin based on maximum outrights. Maximum outrights represents the maximum number of outright positions that could be possible with the current configuration of outright market working orders and filled positions. Maximum outrights preferably takes into account both working buy outright orders and working sell outright orders entered by the trader(s) into outright markets.

At step 402, the number of outrights due to working buy outright orders and the total filled net position is determined. For each tradeable object there may be orders working (or resting) in the outright markets. Step 402 preferably takes into consideration any such working buy orders even though they have not been filled. Step 402 results in a number equal to the absolute value of (total filled net position+working buy outright orders).

At step 404, the number of outrights due to working sell outright orders and the total filled net position is determined. Again, for each tradeable object there may be orders working (or resting) in the outright market. Step 404 preferably takes into consideration any such working sell orders even though they have not been filled. Step 404 results in a number equal to the absolute value of (total net position−working sell outright orders).

With respect to steps 402 and 404, the number of outrights due to working buy and sell orders preferably includes any attempted outright orders. That is, when a trader or trading application attempts to send a buy or sell order, the system includes those in the working buy and sell orders. Then, for example, the system can determine whether the order should be sent to the exchange based in part on the computed margin requirement.

At step 406, maximum outrights is determined. In the preferred embodiment, maximum outrights is equal to the maximum of the result from step 402 and the result from step 404.

Once maximum outrights is determined, it may be used to compute the outright margin by multiplying maximum outrights by a base margin value for outright markets. Then, the total margin required can then be computed by adding the spread margin to the outright margin. Note that if a group of traders were being monitored by the system, according to the preferred embodiment, the total margin requirement for each trader is added together to provide a total margin requirement for the entire group.

IV. Examples for Computing a Margin Requirement

FIGS. 5-10 show example inputs and a margin requirement output from a module that operates substantially similar to the spread risk calculator 100 described with respect to FIG. 1. Although the formulas for computing the margin requirement have been introduced above, they are again described below.

Turning now to the Figures. Each of the Figures is filled with example information for trading tradeable objects for the months of March ("MAR"), June ("JUN"), September ("SEP"), and December ("DEC"). The Figures may include information for a greater or fewer number of tradeable objects, and therefore a greater or fewer number of months may be included. Also, the Figures may include information for different tradeable objects, and therefore different months may also be used.

Of course, it should also be understood that a tradeable object may be identified using a variety of different identifiers, and it is not necessary that a tradeable object only be identified by a corresponding month. Also, the tradeable objects illustrated in FIGS. 5-10 are tradeable objects for different delivery months (e.g., expiration dates); however, some types of tradable objects may be listed according to different strike prices instead of delivery months, or they may be listed according to some other relationship.

Inputs into the system include the filled net long position ("Filled Net Long Position"), filled net short position ("Filled Net Short Position"), working buy and sell outright orders for the outright markets ("W Buy" and "W Sell" under "Outright Positions"), and buy and/or sell spread orders for exchange provided spreads in which the system breaks this input down into equivalent positions in the legs of the spread ("W Buy" and "W Sell" under "Positions Based on Spreads"). Alternatively, as described above, an exchange and/or gateway could break this spread order input down and provide the equivalent positions (e.g., "W Buy" and "W Sell") in the legs of the spread.

The Figures additionally show values that are preferably calculated by the system. They include a maximum leg position ("Max Leg Position"), a number of spreads ("Spreads"), a number of outrights ("Outrights"), and maximum number of outrights ("Max Outrights"). Also included are the spread margin base ("S-Margin" "Base=10") and the outright margin base ("O-Margin" "Base=100"). These base values (e.g., "10" and "100") represent an amount of margin required to purchase a particular tradeable object and can be adjusted accordingly. For example, as shown in Figures, the spread margin base has a value of 10, while the outright margin base has a value of 100. Thus, the amount deducted from the trader's margin balance for trading a spread would be one-tenth the amount deducted for trading an outright object of the same price. Of course, these values are merely examples. They can be set to any other values or ratios, and they can be set by various different factors. For example, the values may change depending on the margin base values given by a trading house, clearing house and/or exchange. Another calculated value is the total margin requirement ("Total Margin"). These show the relative margin requirements and the total margin requirement for the trader's outstanding positions. According to the preferred embodiment, the computed margin requirement is preferably output from the module and used accordingly.

The relationships, first introduced with respect to FIGS. 3 and 4, which are used to calculate some of the variables shown in FIGS. 5-10 are described directly below, as shown in the following formulas:

(1) Total Filled Net Long Position=summation of each filled net long position for each of the tradeable objects. In this example, there are "4" months and hence four tradeable objects. For example, total filled net long position=filled net long position for March+filled net long position for June+filled net long position for September+filled net long position for December.

(2) Total Filled Net Short Position=summation of each filled net short position for each of the tradeable objects. For example, total filled net short position=filled net short for March+filled net short for June+filled net short for September+filled net short for December.

(3) W Buy Total (Outright Positions)=summation of each working outright buy order for each of the tradeable objects, or in this example, for each of the 4 months. These represent working orders for tradeable objects.

(4) W Sell Total (Outright Positions)=summation of each working outright sell order for each of the tradeable objects, or in this example, for each of the 4 months. These represent working orders for tradeable objects.

(5) W Buy (Positions Based on Spreads)=represents an equivalent of a working buy order in a leg of a spread offered by an exchange that guarantees fills in both legs (e.g., such as provided by the exchange "LIFFE"). For example, as described above, if a trader places an order to buy one exchange provided March/June spread, that spread order can be represented by a W Buy in March and a W Sell in June. According to the preferred embodiment, the orders that the exchange is entering are shown in the Figures under the "Positions Based on Spreads" column.

(6) W Sell (Positions Based on Spreads)=represents an equivalent of a working sell order in a leg of a spread offered by an exchange that guarantees fills in both legs (e.g., such as provided by the exchange "LIFFE"). See, for example, the discussion above with respect to W Buy (Positions Based on Spreads).

(7) Total Maximum Leg Position=summation of each maximum leg position for each of the tradeable objects, and in this example, for the 4 months.

(8) Maximum Leg Position (e.g., March)=the maximum of (absolute value (Filled Net Long Position−Filled Net Short Position+W Buy (Positions Based on Spreads)), (absolute value of Filled Net Long Position−Filled Net Short Position−W Sell (Positions Based on Spreads)). Maximum leg position is the maximum position possible —and thus the worst case—with respect to filled outright orders, filled spread orders, and working spread orders. Thus, this generally represents the worst case. Working spread orders are taken into account here as once they are filled, they will be spreads; however, working outright orders are generally not taken into account in determining the Maximum Leg Position. Recall from FIG. 3, that from this maximum leg position, the number of spreads (generic spreads) can be determined.

(9) Spreads=(Total Maximum Leg Position−Outrights)/2. As described above, this is divided by 2 to account for calendar spreads where there are two legs. This value also represents the generic spread position. In situations where a spread has more than two legs (e.g., butterfly spread with 3 legs or a condor spread with 4 legs), the system preferably breaks the multi-legged spread into a 2-legged spread and then analyzes it according to the relationships described herein. For non net-zero spreads such as a pack, bundle, or strip spread, the system preferably evaluates them as outright positions. Additionally, if the spreads results in a fraction (e.g., 0.5, 1.5, etc.) then a less conservative solution would include rounding down this value (Spreads) to the next closest integer. Alternatively, one could round up to the next closest integer, but that might result in having more spreads and a more conservative estimate of the margin requirement.

(10) Outrights=Absolute value (Total Filled Net Long Position−Total Filled Net Short Position). This is equivalent to the absolute value of (Total Net Position).

(11) Max Outrights=The maximum of (absolute value (Total Filled Net Long Position−Total Filled Net Short Position+W Buy Total (Outrights)), absolute value (Total Filled Net Long Position−Total Filled Net Short Position−W Sell Total (Outrights))).

(12) S-Margin=Spreads*Base (S-Margin). The Base for spreads is set to "10," however, it should be understood that this value could be changed. For example, the base for spreads could be set to some different value. As illustrated in the preferred embodiment, the same base value is used for all spreads, and therefore, all spreads have the same margin requirement. In an alternate embodiment, different spreads can have different base values, and therefore also different margin requirements. This can be used, for example, to take into account the relative risk of different spreads. Spreads that have a closer price correlation between the legs will generally be less risky than spreads where the price correlation between the legs is not as strong. In one embodiment, the system can use a lower base value, and thereby also a lower margin requirement, for spreads where the legs are more closely correlated. For example, when the expiration dates of the legs of a spread are closer together (e.g., a January 2003/February 2003 spread) there will generally be a stronger price correlation between the legs than in a spread where the expiration dates of the legs are farther apart (e.g., January 2003/August 2003 spread). The system can accordingly use a lower base value in computing the margin requirement for the less risk spread.

(13) O-Margin=Max Outright*Base (O-Margin). The Base for outright positions is set to "100," however, it should be understood that this value can change.

(14) Total Margin=S-Margin+O-Margin. This value represents the computed margin requirement.

In the simplest case, to determine the maximum number of outright positions and/or spread positions, the system preferably examines the computed total net long and total net short values. The lesser of the of the two values represents the generic spread number; the difference between both preferably constitutes the maximum outrights. In other situations, the system preferably takes into account working orders in the outright markets and/or working orders in the spread market when computing the generic spread number and the maximum number of outrights. In such cases, the generic spread position (or "Spreads") can be found using equation (9) above. The maximum number of outrights (or "Max Outrights") can be found using equation (11) above. Some examples are provided below to assist in illustrating some of the previously described relationships.

A. EXAMPLE 1

FIG. 5 shows a working buy order placed in an outright market for March. Once the order is placed (note that the order could be an attempted order), the maximum outright position changes to "1." The maximum outright position would occur if the order fills, thereby generating a one outright position for the trader. Note that the outright value is "0," because the buy order is still working and has not yet been filled. Thus, while the order is pending the trader has no outright positions. The O-Margin position is 100*1=100. The total position is 0+100=100. The total position represents the margin requirement of "100." If the working buy order was an attempted order, the preferred system could determine based on the margin requirement and the available margin balance as to whether the order could be forwarded to an exchange.

B. EXAMPLE 2

FIG. 6 shows the same working buy order placed in FIG. 5, and in addition it shows a working sell order placed in an outright market for June. After placing the sell order, the trader still has no outrights because neither order has yet to be filled. Thus, the outrights value remains at 0. The maximum outrights also remains 1, which would occur if either the buy order or the sell order were filled thereby generating either a net long or a net short position (depending on which order fills) for the trader.

If both the buy order and the sell order were to fill, the trader would seemingly have two outrights. This would not be the case, however, because if both orders filled then the trader would hold a net long position in one month and a net short position in another month. The two outright positions would combine to form a spread, with one leg of the spread being the March buy order and the second leg of the spread being the June sell order. Although both are held as outright positions, the practical effect of these two countervailing positions is to hedge the trader's risk the same as if trader traded a spread with the same two legs. This occurs in spite of the fact that the trader traded the legs in an outright market instead of simply trading the spread in a spread market. The O-Margin position remains "100" and the total position remains "100." The margin requirement is "100."

C. EXAMPLE 3

FIG. 7 shows that the working buy order placed in FIG. 5 has been filled and the working sell order placed in FIG. 6 remains in the market. The outrights value now becomes "1," because the buy order filled and the trader now holds one outright position. The maximum outrights remains "1." As previously described, the maximum outrights for this example occurs if either the buy order or the sell order fills, thereby generating one outright for the trader. If both orders fill, the two would combine to form a spread instead of two outright positions.

The maximum leg position for March becomes "1." Note, however, that the maximum leg position for June remains at "0." The margin requirement remains at "100."

D. EXAMPLE 4

FIG. 8 shows that the working sell order placed in FIG. 7 has been filled. The number of outrights is "0" since the total net long and the total net short are equal. Thus, instead of being treated as two separate outright positions, the March net long position combines with the June net short position to create a spread. The total maximum leg position becomes "2."

From the total maximum leg position and the number of outrights, the generic spread position can be found. In this example, one spread exists. Hence, the S-Margin position is 10*1=10. The total position is 10+0=10. The margin requirement is "10."

E. EXAMPLE 5

FIG. 9 shows that a working buy March/June spread order was entered. The total maximum leg position now goes to "4." The total outrights is still "0," but the number of spreads goes to "2." One spread from the filled positions (net long and net short) and one spread from the working buy/sell spread. Therefore, the S-Margin position becomes 10*2=20. The total position is 20+0=20. The margin requirement is "20."

F. EXAMPLE 6

FIG. 10 shows that a working buy March/June spread order was entered and filled. So, the total net long is "2" and the total net short is "2." The total maximum leg position remains at "4." The total outrights is still "0," but the number of spreads remains at "2." The S-Margin position is 10*2=20. The total position is 20+0=20. The margin requirement is "20."

V. Examples for Computing a Margin Requirement using Average Expirations in Order to Compute Margin Values for Spreads FIGS. 11-15 show example inputs and a margin requirement output from a module that operates substantially similar to the spread risk calculator described with respect to FIG. 1. The formulas for computing the margin requirement are similar to those previously described. However, the system may be modified to use average expirations in order to compute the margin values for spreads.

As previously described, a spread may be used to hedge a trader's risk in trading a tradeable object. Thus, a spread position is usually considered to be a lower risk strategy than an outright long or an outright short position. For example, if the price trend of a tradeable object is currently up and the trader is in a spread, (e.g., short one month and long another) the gain on the long position would likely offset the loss of the short position, and vice-versa. One side of the spread typically hedges the other, and therefore spreads typically have lower margin requirements than outright positions.

Spreads operate to hedge a trader's risk due to a correlation between the legs of the spread. When the legs of the spread are correlated, an increase in the price of one leg then typically corresponds to a decrease in the price of the other leg, thereby allowing the spread to hedge the trader's risk. If the legs were not correlated, then an increase in the price of one leg would not necessarily correspond to a decrease in the price of the other leg. Thus, where the legs of the spread are not correlated, or at least not strongly correlated, the spread would not effectively operate to hedge the trader's risk.

The legs of a spread may be correlated to varying degrees. For example, legs of a spread that have closer expiration dates are typically more closely correlated than legs of a spread that have expiration dates that are farther apart. Thus, a March/June spread is typically more closely correlated than a March/September spread. Of course, other factors may operate as well to define the correlation between legs of a spread. When the legs are more closely correlated, the spread typically operates more effectively to hedge the trader's risk.

As previously described, in the preferred embodiment, a margin requirement can be computed on the fly for a trader. The computed margin requirement can take into account working and filled outright positions that actually comprise a spread even though those positions were traded separately in the outright market. These outright positions can be combined into spreads when computing the trader's margin requirement. For example, net long positions can be combined with net short positions in order to form spreads, which are then assessed the base margin value for spreads instead of the base margin value for outright positions in making the margin requirement computation.

Instead of simply using one margin value for spreads in making the margin requirement computation, the system can optionally take into account the correlation between the legs of the spread, and hence the risk associated with the spread, when determining what margin value to use for a particular spread. Thus, the margin value applied to a particular spread can vary depending on the correlation between the legs of the spread and therefore how effectively the spread hedges the trader's risk.

One way to vary the margin value for spreads is to use the difference between the times to expiration for the legs of the spread. In one embodiment, the system might vary the margin value applied to a particular spread depending on how close or far apart the expiration times of the legs of the spread are. Where the expiration times are closer together, the system might apply a lower margin value. Where the expiration times are farther apart, the system might apply a higher margin value. For example, the system might use a lower margin value for a March/June spread than it uses for a March/September spread.

In computing the generic spread positions, or otherwise combining outright positions to form spread positions, the system may pair specific outright long positions with specific outright short positions. For example, the system may pair specific filled outright long positions with filled outright short positions in order to form a spread. The relative distance between the legs can then be used to determine the base margin value to be applied to the spread. Similarly, the system may pair specific working outright long positions with working outright short positions, and it may then use the relative distance between the legs to determine the margin value to be applied to the spread. Of course, other combinations may be made as well.

However, it is not necessary that particular positions are assigned to particular spreads in making these computations. In a preferred embodiment, the system can use average times to expiration in order to compute a margin value to be applied to the various spreads. The system might compute an average time to expiration for the long and buy positions, and it might compute an average time to expiration for the short and sell positions. The average expiration times can then be used to determine an average distance between the legs of the spread, thereby computing an average distance between the legs of the various generic spreads. The system can then use this average distance in computing the margin requirement, thereby taking into account the correlation (and therefore also the relative risk) across all the generic spreads.

FIGS. 11-15 show example inputs and margin requirement outputs from a module that operates substantially similarly to the spread risk calculator 100 described with respect to FIG. 1. Each of the Figures includes example information for trading tradeable objects for the months of March, June, September and December. Many of the fields displayed in FIGS. 11-15 were previously described with respect to FIGS. 5-10. However, FIGS. 11-15 include some modifications for using average expirations to compute margin values for spreads.

As depicted, the Figures include a time to expiration ("Time to Exp") for the various tradeable objects. These are generally static values that represent the number of months from the present month until the delivery month for the tradeable object. For a current month of February, the time to expiration for a tradeable object with a March delivery date is one month. Thus, the March tradeable object has a value of "1" displayed in the "Time to Exp" column.

The times to expiration for the other tradeable objects are determined similarly. For the current month of February, the delivery month of a June tradeable object is four months away, the delivery month of a September tradeable object is seven months away, and the delivery month of a December tradeable object is ten months away. Thus, the time to expiration for June is "4", the time to expiration for September is "7" and the time to expiration for December is "10." It should be understood, however, that various other time periods may be used in computing the time to expiration values displayed in the "Time to Exp" column. For example, weeks, days, hours, minutes or some other measure might alternatively be used. Also, it is not even necessary that the "Time to Exp" column is displayed at all.

The Figures additionally include a weighted buy value ("Weight Buy") for the net long and working buy positions, and they include a weighted sell value ("Weight Sell") for the net short and working sell positions. The weighted buy and weighted sell values can be used in computing the average expirations for the tradeable objects, which are then used to compute the margin value for the spreads. The weighted buy and weighted sell values generally represent a weighting based on the time to expiration of working and outright positions for a particular month. As previously described, and as applied to other computations as well, it is not necessary to use months in computing these values. Other time periods may also be used.

The Figures additionally depict an average distance ("Avg. Distance") for the weighted buy and weighted sell values. The average distance for the weighted buy is generally the sum of the weighted buy values divided by the number of positions used to form the weighted buy values. For the weighted buy values, the average distance generally represents the distance from the current month to the average expiration of the working and outright positions used to form the weighted buy values. The average distance for the weighted sell is generally the sum of the weighted sell values divided by the number of positions used to form the weighted buy values. For the weighted sell values, the average distance the generally represents the distance from the current month to the average expiration of the positions used to form the weighted sell values.

An average spread length ("Avg. Spread Length") generally depicts the average spread length for the various generic spreads. Thus, the average spread length is generally the difference between the average distance for the weighted buys and the average distance for the weighted sells. In addition, the Figures depict a spread indication ("Spread Indicator"). The spread indicator is generally derived from the average distances for the weighted buy and weighted sell, and it indicates whether the trader is long or short based on the average expiration distances.

The base spread margin value in the Figures has also been modified. Instead of using one base spread margin value that is applied equally to all spreads, the system may use a time-based spread margin value, which can be applied based on the difference between the legs of the spread. Thus, the S-Margin field has been modified to have a time base of 20 ("S-Margin", "Time Base=20"). The time base can generally represent an amount of margin to be applied for a specific time increment. For example, the time base might represent a margin value for increments of days, weeks, months or some other time. It should also be understood that the time base of "20" is merely exemplary in nature, and it may be varied as well. The margin value for a particular spread can then be determined based on the distance between the legs of a spread (e.g., the difference in delivery times).

The formulas for using average expirations in order to compute margin values may use those formulas described with respect to FIGS. 5-10. In addition the calculations may use other formulas, which are described below:

(15) Individual Leg S Buy=S_leg Long+W Buy (Spreads). This represents the number of individual buy legs for a particular month that are used in computing the weighted buy value for that month.

(16) Individual Leg S Sell=S_leg Short+W Sell (Spreads). This represents the number of individual sell legs for a particular month that are used in computing the weighted sell value for that month.

(17) Weighted Buy=Individual Leg S Buy*Time to Exp. This represents the weighted buy values for a particular month.

(18) TOTAL Weight Buy=summation of all the weighted buy values for the four months.

(19) Weighted Sell=Individual Leg S Sell*Time to Exp. This represents the weighted sell values for a particular month.

(20) TOTAL Weight Sell=summation of all the weighted sell values for the four months.

(21) Avg. Distance Weight Buy=TOTAL Weight Buy/TOTAL net long. This represents the average distance for the weighted buy values.

(22) Avg. Distance Weight Sell=TOTAL Weight Sell/TOTAL net short. This represents the average distance for the weighted sell values.

(23) Avg. Spread Length=absolute value (Avg. Distance Weight Buy−Avg. Distance Weight Sell). This is the absolute value of the difference between the average distance for the weighted buys and the weighted sells.

(24) S-Margin=Spreads*Time Base*Avg. Spread Length. This represents the margin requirement for the spreads. The time base multiplied by the average spread length represents the margin requirement for the average spread, and this value is then multiplied by the number of spreads to get the overall margin requirement for the spreads.

(25) S_leg Long and S_leg Short represent the net long and short positions with the excess outright positions removed. Thus, where there is a different number of outright net long positions than net short positions such that the outright positions do not all combine to form spreads, the S_leg Long and S_leg Short values remove the excess positions. These values can be calculated, for example, using the exemplary code listed in Table 1. It should be understood, however, that the code listed in Table 1 is merely one method for removing excess outright positions, and many other methods may also be used. Also, other methods for determining which outright positions to remove may be used, and the particular outright positions that are removed by whatever method is used may affect the computed S-Margin value and therefore also the total margin requirement.

TABLE 1

Sample Code for Calculation of S_leg Long and S_leg Short

```
Private Sub CalcSlegs_Click( )
Dim outLong As Long
Dim outShort As Long
Dim outAvg As Long
Dim currOffset As Long
Dim tmp As Long
Dim t_row As Long
Dim idx As Integer
```

TABLE 1-continued

Sample Code for Calculation of S_leg Long and S_leg Short

```
        outLong = ActiveWorkbook.ActiveSheet.Range("NetLong")
        outShort = ActiveWorkbook.ActiveSheet.Range("NetShort")
        If outLong > outShort Then
            outLong = outLong – outShort
            outShort = 0
        ElseIf outShort > outLong Then
            outShort = outShort – outLong
            outLong = 0
        Else
            outLong = 0
            outShort = 0
        End If
            currOffset = 0
            outAvg = (outLong / 4)
            If (outLong Mod 4) <> 0 Then outAvg = outAvg + 1
            t_row = 3
            For idx = 0 To 3
            With ActiveWorkbook.ActiveSheet
                tmp = .Range("B" & t_row)
                If currOffset < outLong Then
                    If tmp >= outAvg Then
                        tmp = tmp – outAvg
                        currOffset = currOffset + outAvg
                    End If
                End If
                .Range("E" & t_row) = tmp
            End With
                t_row = t_row + 1
            Next idx
            currOffset = 0
            outAvg = (outShort / 4)
            If(outShort Mod 4) <> 0 Then outAvg = outAvg + 1
            t_row = 3
            For idx = 0 To 3
            With ActiveWorkbook.ActiveSheet
                tmp = .Range("C" & t_row)
                If currOffset < outShort Then
                    If tmp >= outAvg Then
                        tmp = tmp – outAvg
                        currOffset = currOffset + outAvg
                    End If
                End If
                .Range("F" & t_row) = tmp
            End With
                t_row = t_row + 1
            Next idx
        End Sub
```

It should be understood that the formulas described herein are merely exemplary in nature, and various changes may be made. For example, many modifications may be made to the ways the filled outright positions, working outright positions, filled spread positions and working spread positions are used to form the maximum number of spreads and also to compute the average expirations. Other changes may be made as well, and these may have an effect on the exact total margin requirement.

Additionally, it should be appreciated that the calculations of the variables may be implemented in a variety of different ways. For example, the formulas previously described include some formulas that may be considered intermediate variables—such as S_legs Long, S_legs Short, Individual Legs S Buy and Individual Legs S Sell—that are derived from some variables and then used in computing other variables. While these intermediate variables can be computed and then used in the computations of other variables, it is not necessary that they be computed outright. Thus, one or more of these intermediate variables may be combined into the formulas for other variables such that instead of computing an intermediate variable and then plugging it into the formula for another variable, the other variable might be computed directly. These are merely examples, and many other modifications may be made to the way the calculations of the variables are implemented.

The operation of the system using average expirations in order to compute margin requirements will now be described with reference to various examples.

A. EXAMPLE 1

FIG. 11 shows one filled long position in an outright market for March, and it shows one filled short position in an outright market for June. Although these are outright positions, they may be treated as legs of a spread in order to generate a reduced margin requirement for the trader. The total number of net long positions is one, and the total number of net short positions is one. The system then combines these two positions to form a spread. Thus, for purposes of computing the margin requirement, the system treats the trader has having one spread position and no outright positions.

Using the previously described formulas, the March S_leg Long is "1", and the June S_leg Short is also "1." The March Individual Legs S Buy is "1", and the June Individual Legs S Sell is "1." The March weighted buy is then 1*1=1, and the June weighted sell is 1*4=4. These then represent weighted distances to the buy and sell expiration times (e.g., delivery dates). In this example, the weighted buy average distance is 1/1=1, and the weighted sell average distance is then 4/1=4. In this example, the average spread length is 4−1=3. The spread indicator then displays "LONG", thereby indicating that the trader is long the spread.

As this example uses a single spread, the average expiration times and distances should correspond exactly to the legs of this one spread. The first leg of the spread is a March long position, which for a current month of February, has a delivery month that is one month away from the current month. This matches with the weighted buy average distance of one, which indicates that the average distance of the near legs of the spreads is one month away. The second leg of the spread is a June short position, which for the current month of February has a delivery month that is four months away. This matches with the weighted buy average distance of four, which indicates that the average distance of the far legs of the spreads is four months away. The computed average distance of the spread is three. This matches with the actual distance of the March/June spread, which is three months. As this example shows, for a single spread, the computed average expirations and distance match with this single spread's actual values.

The margin requirement can then be computed using the average spread length. The spread margin value is generally computed by multiplying the time base by the average spread length and also by the number of spreads. The product of the average spread length and the time base generally represent the margin value to be applied to a particular spread. It should be understood, however, that other linear or non-linear functions might be used to determine the spread margin value.

Further, the system may implement minimum and/or maximum spread margin values. For example, the system may compute the spread margin value using the previously described methods. If the computed spread margin value is below the minimum spread margin value, the system may then use the minimum spread margin value instead of the computed spread margin value in determining the trader's total margin requirement. Similarly, if the system determines that the computed spread margin value is greater than the maximum spread margin value, then the system may use the maximum spread margin value instead of the computed spread margin value in computing the total margin requirement. For example, when computing the margin value for a two leg spread, the system may use a maximum spread margin value that is twice the margin value used for an outright position.

Since the spread margin value is based on the temporal different between the legs of the spread, and hence the correlation between the legs of the spread, the margin value may more accurately reflect the risk associated with the spread. Spreads having legs that are farther apart, and which are therefore are less strongly correlated, will generate higher margin values. Spreads having legs that are closer apart, and which are therefore are more strongly correlated, will generate lower margin values. In this example, the spread margin value is 3*20*1=60. As there are no outright positions, the total margin requirement is "60."

B. EXAMPLE 2

FIG. 12 shows the March long position, and it also shows a September short position in the outright market. Similar to FIG. 11, FIG. 12 has two outright positions that the system combines to form a spread when computing the trader's margin requirement. The March/September spread of FIG. 12 has legs that are farther apart than the March/June spread of FIG. 11. Therefore, and as shown in this example, the system computes a higher margin value for the March/September spread than it computes for the previously described March/June spread.

For this example, the March S_leg Long is "1", and the September S_leg Short is "1." The March Individual Legs S Buy is "1", and the September Individual Legs S Sell is "1." The weighted buy value is then 1*1=1. The weighted sell value is 1*7=7. The weighted buy average distance is 1/1=1. The weighted sell average distance is 7/1=7. Using these two numbers, the system computes the average spread length. The average spread length then is 7−1=6. The spread indicator shows "LONG", because, based on the average distances, the trader is long the spread. The system then uses the time based spread margin to compute the margin value for this spread. The computed margin value is 6*20*1=120.

The computed average expiration and distances match with those for this single spread position. The weighted buy average distance is "1", which matches with the March leg of the spread that has a delivery month that is one month out from the current month. The weighted sell average distance is "7", which matches with the September leg of the spread that has a delivery month that is seven months out from the current month. The average spread length is "6", which matches with the six month difference between the March and September legs of the spread.

The margin value for this spread is "120." This is different than the single spread depicted in FIG. 11 that generated a margin value of "60." The legs of the March/September spread have delivery months that are farther apart, and therefore are generally less correlated. Therefore, there is a greater risk associated with this spread, and the system generates a higher margin requirement for this spread than it does for the March/June spread.

C. EXAMPLE 3

FIG. 13 shows the March long position in the outright market and the June short position in the outright market. Additionally, FIG. 13 shows two orders in a spread market, which are displayed on the trading screen as two working buy orders and two working sell orders. Since these order are placed in a spread market, both legs of a spread will either fill or not fill. In computing the margin requirement, the system determines the maximum number of spreads. The two outright positions are treated as a spread, and the two working spread orders are treated as spreads. Thus, for purposes of computing the margin requirement, the number of spreads is "3."

The March S_leg Long is "1", and the June S_leg Short is "1." The March Individual Legs S Buy is "1"; the June Individual Legs S Sell is "1"; the September Individual Legs S Buy is "2"; and the December Individual Legs S Sell is "2." The system then computes the various average expirations and distances. The weighted buy value for March is 1*1=1. The weighted sell value for June is 1*4=4. The weighted buy value for September is 2*7=14. The weighted sell value for December is 2*10=20. The total weighted buy value is 1+14=15, and the total weighted sell value is 4+20=24. The average distance for the weighted buy is 15/3=5, and the average distance for the weighted sell is 24/3=8. The average spread length is then 8−5=3.

The average spread length is then used to compute the spread margin value. The spread margin is the average spread length multiplied by the time base for spreads and also multiplied by the number of spreads. In this example, the spread margin value is 3*3*20=180. As there are no outright positions, the total margin requirement is simply the spread margin value, which is "180."

D. EXAMPLE 4

FIG. 14 shows another example computation of a margin requirement. As depicted in FIG. 14, the trader holds ten March long positions in the outright market, seven June short positions in the outright market, two September long positions in the outright market and five December short positions in the outright market. For this example, the March S_legs Long is "10"; the June S_legs Short is "7"; the September S_legs Long is "2"; and the December S_legs Short is "5." The March Individual Legs S Buy is "10"; the June Individual Legs S Sell is "7"; the September Individual Legs S Buy is "2"; and the December Individual Legs S Sell is "5."

The weighted buy value for March is "10", the weighted sell value for June is "28", the weighted buy value for September is "14" and the weighted sell value for December is "50." The total weighted buy value is "24", and the total weighted sell value is "78." These values are divided by the total net long and total net short position to get the average distances. The weighted buy average distance is "2", and the weighted sell average distance is "6.5." The average spread length is then "4.5." The spread margin requirement is then 4.5*20*12=1080.

In one way of looking at these computations, the system idealizes the various net long and net short positions in the outright market into an idealized spread position, which has a near leg that is the average of the long positions and a far leg that is the average of the short positions. In this example, it would be a spread having a near leg that is two months away from the current month and a far leg that is six and a half months away from the current month. This idealized spread is the multiplied by the total number of spreads and also time based spread margin in order to get the total margin for the trader's spread positions.

E. EXAMPLE 5

FIG. 15 shows two March long positions in the outright market and two September short position in the outright market. Additionally, it depicts one June working buy order in the outright market. In computing the margin requirement, the system again determines the maximum number of spreads and outright position. In the worst case, if the working buy order fills, the trader will have three outright long positions and two outright short positions. Therefore, for purposes of computing the margin requirement, the number of spreads is "2" and maximum outrights is "1."

Making the computations as previously described, the March S_legs Long is "2", and the September S_legs Short is "2." The March Individual Legs S Buy is "2", and the September Individual Legs S Sell is "2." The March weighted buy value is "2", and the September weighted sell value is "14." The total weighted buy value is then "2", and the total weighted sell value is "14." The weighted buy average distance is 2/2=1. The weighted sell average distance is 14/2=7. The average spread length is then 7−1=6.

The spread margin value is then the average spread length multiplied by the number of spread and the spread margin time base. For this example, the spread margin value is 6*2*20=240. In the worst case, there will be one additional outright position, which has a margin value of 2000. The total margin requirement is then the sum of the spread margin value and the outright margin value, which is 240+2000=2240.

VI. Displaying Relevant Information

The variables described in this application may be displayed, such as on a graphical user interface (GUI). However, as can be noted from the examples, it is not necessary that all of the variables be displayed. And, it is not necessary that all the variables depicted in the Figures be displayed. In alternate embodiments, some variables depicted in the Figures may be omitted, while other variables not depicted in the Figures may be added. In various embodiments, the variables displayed on the GUI may be fixed, such as by a GUI manufacturer. In other embodiments, however, the variables displayed on the GUI, as well as other attributes of the GUI, may be customizable by a user.

The GUI can include any visual computer environment that represents components of the system with graphical images, such as icons, menus, and dialog boxes on the screen. Some examples of how and/or why one might display such information are described directly below, but additional reasons for displaying such information would be realized by one skilled in the art of trading upon reading the description herein.

According to one example, a trader can run the system in conjunction with other software that the trader uses to connect to an exchange and execute trades. While the trader interacts with the exchange using the other software, the trader can simultaneously view the information to track the margin requirements for the trader's positions and working orders. This allows the trader to conveniently view his or her current margin balance, as it is updated in real-time. Limits which are imposed on the trader may also be displayed so as to inform the trader when a limit has been reached.

In another example, a group of traders can run the system and view the information as the system tracks the margin requirement for each of the traders and/or tracks the margin requirement for the entire group. The margin requirement for the entire group could be just the sum of the margin requirements for each trader. This allows the traders to view their margin balance as a group, as it is updated in real-time. Similar to individual traders, limits which are imposed on the traders may be displayed to inform them when a limit has been reached.

In yet another example, an administrator or another user at a trading house, clearing house, exchange, or other entity can view the margin requirements for a particular trader or a group of traders. The spreadsheet can be updated in real-time, and thus the administrator or other user can view the trader's (or traders') changing margin requirements.

VII. Conclusion

The preferred embodiment described herein provides a quick and efficient way of computing risk associated with outright positions and spread positions for risk purposes. Current SPAN algorithms and similar risk management solutions are often too complicated and time consuming to be used for real time (or near real time) pre-trade spread risk management. Therefore, a system and method were described herein to calculate the risk based in part on working outright orders and working spread orders for exchange traded spreads. A generic spread number is determined in addition to a maximum outrights value, in which a margin requirement is computed. The computed margin requirement can be used in any fashion known to one of ordinary skill in the art such as by limiting the trading of one or more traders.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for computing margin requirement during the trading day in an electronic trading system, the method comprising:
   determining by a computing device a total maximum leg position based on maximum leg positions for each of one or more tradeable objects, wherein the maximum leg positions represent a maximum position in each leg;
   determining by the computing device a number of total outright positions based on a total filled net long position and a total net short position, wherein the number of total outright positions represents the number of positions that are not considered part of a spread;
   determining by the computing device a number of spreads based on the total maximum leg position and the number of total outright positions, wherein the number of spreads represents a generic spread position;
   determining by the computing device a first average expiration time based on equivalent buy leg spread positions and filled long positions, and further based on expiration times for the one or more tradeable objects;

determining by the computing device a second average expiration time based on equivalent sell leg spread positions and filled short positions and further based the expiration times for the one or more tradeable objects;

determining by the computing device an average distance based on the first average expiration time and the second average expiration time between the legs corresponding to the one or more tradeable object of the spread;

computing by the computing device a spread margin requirement using the average distance, a first base value, and the number of spreads; and providing by the computing device the spread margin requirement, wherein a decision to allow an order to be sent to an electronic exchange is based on the spread margin requirement.

2. The method of claim 1, further comprising:

determining a maximum number of outrights based on a number of outrights due to working buy outright orders and a number of outrights due to working sell outright orders, wherein the maximum number of outrights represents the maximum number of outright positions possible with a current configuration of outright market working orders and filled positions;

determining an outright margin requirement based on the maximum number of outrights and a second based value; and determining a total margin requirement based on the spread margin requirement and the outright margin requirement, wherein the decision to allow the order to be sent is based on the total margin requirement.

3. The method of claim 2, further comprising determining whether to send the order based on the total margin requirement and an available margin balance.

4. The method of claim 3, further comprising sending the order to the exchange when the available margin balance is greater than the total margin requirement.

5. The method of claim 3, further comprising refraining from sending the order to the exchange when the available margin balance is less than the total margin requirement.

6. The method of claim 1, wherein the filled long and short positions exclude excess outright positions that do not combine to form spreads.

7. The method of claim 2, wherein the total margin requirement is computed for one trader.

8. The method of claim 2, wherein the total margin requirement is computed for a plurality of traders.

9. The method of claim 2, wherein the total margin requirement is computed at a client device used by a trader to place orders with the exchange.

10. The method of claim 1, wherein the total maximum leg position is the sum of the maximum leg positions for each of the one or more tradeable objects.

11. The method of claim 1, wherein the maximum leg position for each of the one or more tradeable objects is based on a filled net long position, a filled net short position, an equivalent buy leg spread position, and an equivalent sell leg spread position.

12. The method of claim 10, wherein a maximum leg position for one of the one or more tradeable objects is equal to maximum (absolute value (filled net long position−filled net short position+equivalent buy leg spread position), absolute value (filled net long position−filled net short position−equivalent sell leg spread position)).

13. The method of claim 1, wherein the number of total outright positions is equal to absolute value (a total filled net long position−a total filled net short position).

14. The method of claim 1, wherein the total filled net long position is based on filled net long positions for each of the one or more tradeable objects, wherein the total filled net short position is based on filled net short positions for each of the one more tradeable objects.

15. The method of claim 1, wherein the number of spreads is equal to (the total maximum leg position−the number of total outright positions)/2.

16. The method of claim 1, wherein the first average expiration time is the sum of individual first average expiration times for each of the one or more tradeable objects, and wherein the second average expiration time is the sum of individual second average expiration times.

17. The method of claim 16, wherein the individual first average expiration time for each tradeable object in the one or more tradeable object is based on an equivalent buy leg spread position and an expiration time for the corresponding tradeable object, and wherein the individual second average expiration time for each tradeable object of the one or more tradeable object is based on an equivalent sell leg spread position and an expiration time for the corresponding tradeable object.

18. The method of claim 17, wherein the individual first expiration time is equal to the equivalent buy leg spread position* the corresponding expiration time, and wherein the individual second expiration time is equal to the equivalent sell leg spread position* the corresponding expiration time.

19. The method of claim 1, wherein the average distance is further based on a total net long position and a total net short position.

20. The method of claim 19, wherein the average distance is based on absolute value [(the first average expiration time/the total net long position−(the second average expiration time/the total net short position)].

* * * * *